United States Patent
Shih (10) Patent No.: US 10,446,326 B2
(45) Date of Patent: Oct. 15, 2019

(54) LAMINATED CAPACITOR AND IN-VEHICLE CONTROL DEVICE

(71) Applicant: HITACHI AUTOMOTIVE SYSTEMS, LTD., Hitachinaka-shi, Ibaraki (JP)

(72) Inventor: Hsinhan Shih, Hitachinaka (JP)

(73) Assignee: HITACHI AUTOMOTIVE SYSTEMS, LTD., Hitachinaka-Shi, Ibaraki (JP)

( * ) Notice: Subject to any disclaimer, the term of this patent is extended or adjusted under 35 U.S.C. 154(b) by 262 days.

(21) Appl. No.: 15/522,074

(22) PCT Filed: Sep. 4, 2015

(86) PCT No.: PCT/JP2015/075147
§ 371 (c)(1),
(2) Date: Apr. 26, 2017

(87) PCT Pub. No.: WO2016/067746
PCT Pub. Date: May 6, 2016

(65) Prior Publication Data
US 2017/0316884 A1 Nov. 2, 2017

(30) Foreign Application Priority Data

Oct. 30, 2014 (JP) ................................. 2014-220956

(51) Int. Cl.
*H01G 4/40* (2006.01)
*H01G 4/12* (2006.01)
(Continued)

(52) U.S. Cl.
CPC ............... *H01G 4/40* (2013.01); *H01F 17/00* (2013.01); *H01F 27/00* (2013.01);
(Continued)

(58) Field of Classification Search
CPC ...... H01F 17/00; H01F 27/00; H01F 27/2804; H01F 27/40; H01G 4/12; H01G 4/232; H01G 4/20
(Continued)

(56) References Cited

U.S. PATENT DOCUMENTS 6,414,568 B1 * 7/2002 Matsumura .......... H03H 7/0115
333/177
6,476,690 B1 11/2002 Nakata et al.
(Continued)

FOREIGN PATENT DOCUMENTS

JP 48-054038 U 10/1971
JP 07-263280 A 10/1995
(Continued)

OTHER PUBLICATIONS

Japanese Office Action and its English translation thereof issued in corresponding application No. 2016-556419 dated May 22, 2018.
(Continued)

*Primary Examiner* — Zeev V Kitov
(74) *Attorney, Agent, or Firm* — Foley & Lardner LLP (57) ABSTRACT

The purpose of the present invention is to provide a component in which inductors and capacitors necessary for a low-pass filter and the like can be mounted at high density, and to in turn reduce the size of an electronic control unit in which the component is installed. The electronic control unit is characterized in that: the electronic control unit is provided with a laminated capacitor having built-in circuit patterns and dielectric bodies; the circuit patterns comprise a laminated plurality of coil effect generation patterns and inter-layer connection patterns for series connection of the plurality of coil effect generation patterns; and at least some of the plurality of coil effect generation patterns are used as electrodes for the laminated capacitor.

5 Claims, 7 Drawing Sheets

(51) Int. Cl.
  *H01F 27/40*     (2006.01)
  *H01G 4/30*      (2006.01)
  *H01F 27/28*     (2006.01)
  *H01F 17/00*     (2006.01)
  *H01F 27/00*     (2006.01)
  *H01G 4/012*     (2006.01)
  *H01G 4/232*     (2006.01)

(52) U.S. Cl.
  CPC ......... *H01F 27/2804* (2013.01); *H01F 27/40* (2013.01); *H01G 4/012* (2013.01); *H01G 4/12* (2013.01); *H01G 4/232* (2013.01); *H01G 4/30* (2013.01)

(58) Field of Classification Search
  USPC ........................................................ 361/270
  See application file for complete search history.

(56) References Cited

U.S. PATENT DOCUMENTS

| | | |
|---|---|---|
| 2003/0030510 A1 | 2/2003 | Sasaki et al. |
| 2003/0043759 A1 | 3/2003 | Yamaguchi |
| 2004/0017280 A1 | 1/2004 | Yamamoto et al. |
| 2004/0075968 A1* | 4/2004 | Satoh ...................... H01F 17/04 361/306.3 |
| 2007/0001782 A1* | 1/2007 | Sasaki .................. H03H 1/0007 333/185 |

FOREIGN PATENT DOCUMENTS

| | | |
|---|---|---|
| JP | H07-283031 A | 10/1995 |
| JP | 09-148175 A | 6/1997 |
| JP | H10-190304 A | 7/1998 |
| JP | 2000-151324 A | 5/2000 |
| JP | 2001-167974 A | 6/2001 |
| JP | 2004-048090 A | 2/2004 |
| JP | 2006-054207 A | 2/2006 |
| JP | 2011-192599 A | 9/2011 |
| WO | WO-2011/155240 A1 | 12/2011 |

OTHER PUBLICATIONS

Extended European Search Report issued in corresponding application No. 15 85 5056.6 dated Jun. 6, 2018.

* cited by examiner

SHEET FORMATION (201)

THICKNESS OF 1 μ

ELECTRODE PRINTING (202)

PRESS PROCESS (203)

APPROXIMATELY 600 LAYERS

CUTTING (204)

FIRING (205)

TERMINAL ELECTRODE PASTE (206)

STEP 1 OPEN HOLE
STEP 2 PATTERN PRINTING
STEP 3 PRESS PROCESS
STEP 4 SINTERING

LAMINATED CAPACITOR AND IN-VEHICLE CONTROL DEVICE

TECHNICAL FIELD

The present invention relates to an electronic control unit for controlling an in-vehicle device or a capacitor mounted in the electronic control unit.

BACKGROUND ART

Conventionally, in order to control a car, many electronic control units are incorporated in the car. As described in PTL 1, since a mechanical driving device such as an engine and a transmission, and a battery are incorporated in the limited vehicle space, the space available for the electronic control unit is limited. In order to reduce the size of the electronic control unit, the volume of components and structural members of the electronic circuit have to be reduced. When the electronic circuit is miniaturized, it is difficult to keep ground stability as the density of the plated circuit increases, and there is concern about measures against noise, and measures to suppress noise is also required.

Generally known measures against noise are to provide a low-pass filter and a small coil for constituting the filter. Examples of the small coil include a coil element as in PTL 2, in which four patterns of layers are prepared, laminated, and connected with each other through via holes to generate and laminate a coil loop, and as in PTL 3, an inductance element incorporating a coil winding and a capacitor.

CITATION LIST

Patent Literature

PTL 1: JP 2011-192599 A
PTL 2: WO 2011/155240 A
PTL 3: JP 2006-54207 A

SUMMARY OF INVENTION

Technical Problem

In the method of PTL 2, when a low-pass filter is mounted, four patterns of layers are required to form the coil loop. Accordingly, mounting of the filter involves an increase in mounting area. On the other hand, in the coil of PTL 3, since the capacitor necessary for the low-pass filter is formed in a pattern different from that of the coil winding, there is a concern about the increasing mounting area when a large number of capacitors are formed together with inductance elements.

The present invention is made in view of the above problems, and an object of the present invention is to provide a component which allows an inductance element and a capacitor necessary for a low-pass filter or the like to be mounted with high density. Its object is further to miniaturize the electronic control unit in which the component is mounted.

Solution to Problem

In order to solve the present invention, an electronic control unit according to the present invention includes a laminated capacitor incorporating a circuit pattern and a dielectric body, the circuit pattern including: a plurality of coil effect generation patterns that are laminated; and an inter-layer connection pattern being configured such that the plurality of coil effect generation patterns are connected to each other in series, wherein at least part of the plurality of coil effect generation patterns serves as an electrode of the laminated capacitor.

Effects of Invention

According to the present invention, the application of a coil pattern in a laminated capacitor inside which a plurality of electrodes are laminated allows the coil pattern and the capacitor pattern required for forming the low-pass filter to be mounted in one component with high density, and the miniaturization of the electronic control unit can be further accomplished.

DESCRIPTION OF EMBODIMENTS

Hereinafter, an embodiment in which a coil pattern is incorporated in a laminated capacitor used for an electronic control unit for controlling an in-vehicle device will be described with reference to drawings.

Figure 1:
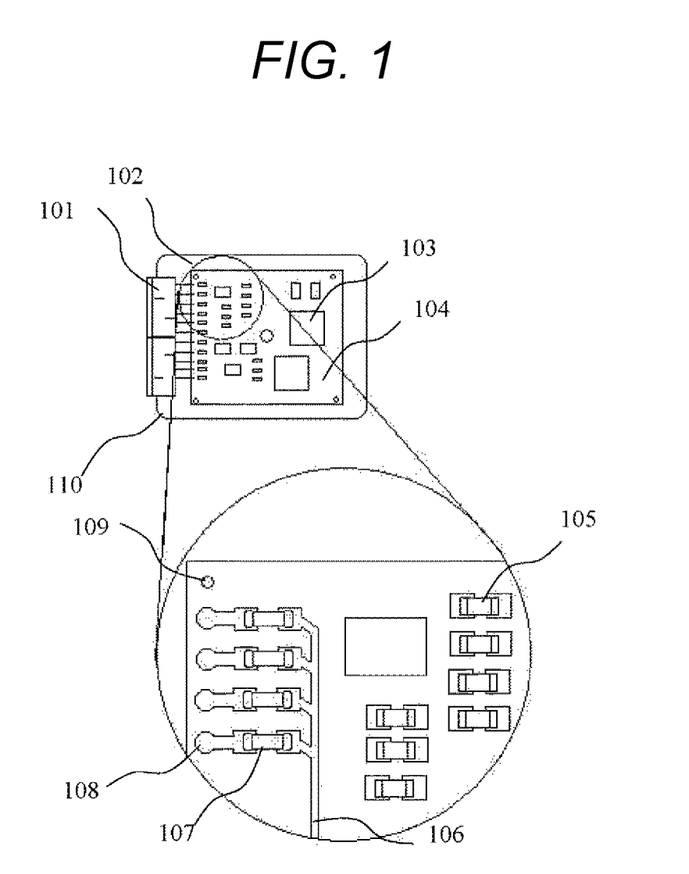
FIG. 1 is an explanatory view of a basic structure of a conventional electronic control unit.

FIG. 1 shows a basic structure of a conventional electronic control unit (ECU) 102. The electronic control unit includes a main body case 110, a connector 101 for connecting with an external device, and a printed circuit board 104. Electronic parts such as an IC 103, capacitors 107, and resistors 105 are mounted on the printed circuit board 104. The packaging area of the board differs depending on the specification of the electronic control unit. In the present embodiment, for the sake of simplicity, description is made with reference to FIG. 1. In the electronic control unit 102, the printed circuit board 104 includes a large number of capacitors 107 in order to prevent or reduce various noises received from external devices and external harnesses.

Although the conventional configuration and capacitors of the conventional electronic control unit 102 have been described above, in general, laminated ceramic capacitors with compactness and large capacitance are employed in order to reduce the volume of the electronic control unit 102. Next, a method of manufacturing the laminated ceramic capacitor will be described with reference to FIG. 2.

Figure 2:
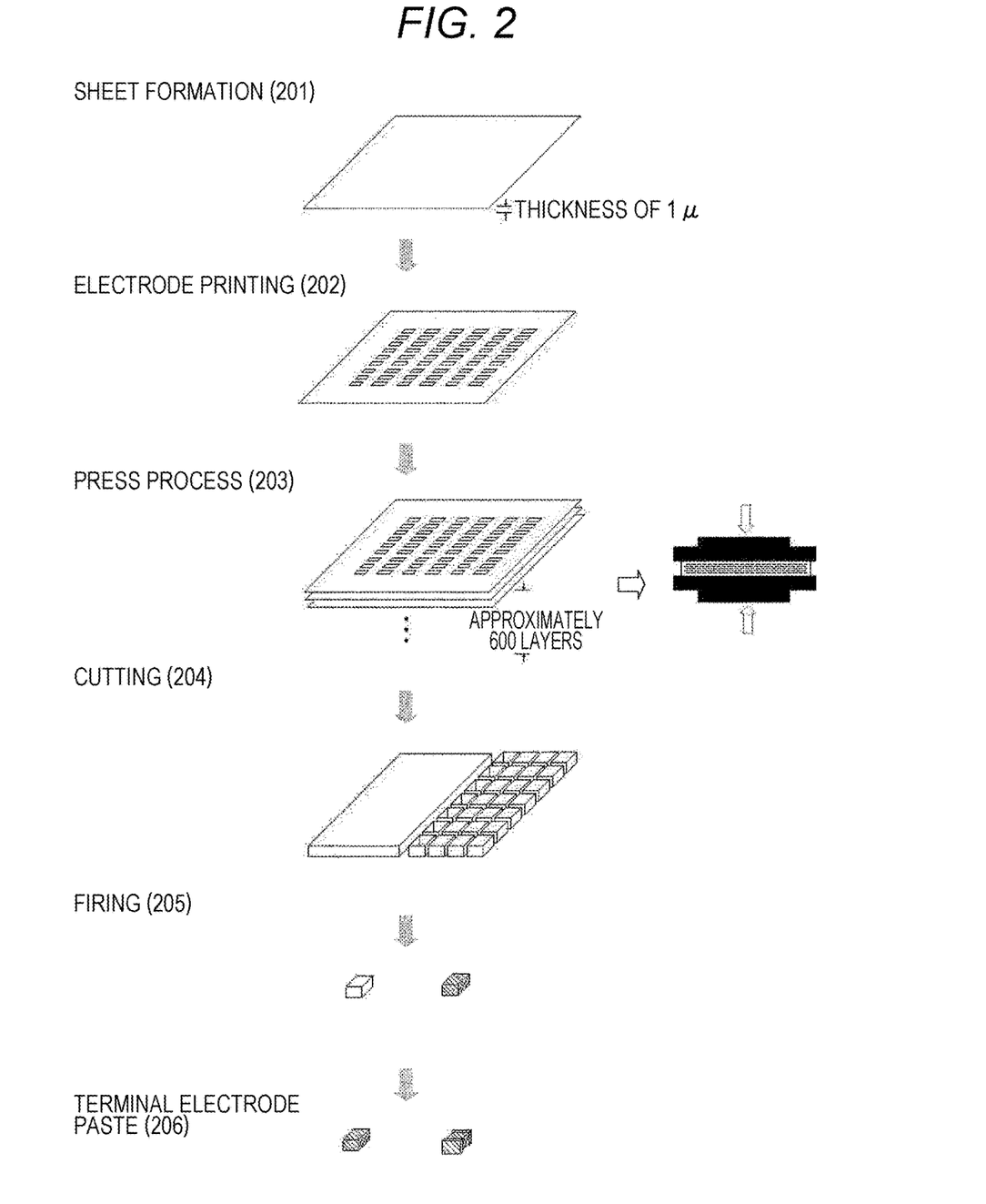
FIG. 2 is an explanatory view of a manufacturing process of a laminated ceramic capacitor.

The first process for the laminated ceramic capacitor is sheet formation 201. A dielectric material sheet made of a slurry dielectric material composed of barium titanate or the like (ceramic material), and having a thickness of about 1 µm, for example, is produced.

The second process is electrode printing 202. In thick film printing technology, for example an electrode made of nickel paste is printed on the dielectric material sheet. While the number of repetition of the first process and the second process varies depending on the capacitance of the capacitor, hereinafter description will be made assuming that the number of repetition is 600.

In the press process 203 as the third process, 600 layers of the sheets produced by the first process and the second process, which have been repeated 600 times, are laminated in the same direction and pressed in the lamination direction to produce a laminated ceramic with a large area.

In cutting 204 as the fourth process, the cutting is made along the printed electrode pattern so as to produce small sized laminated ceramic capacitors.

The fifth process is firing 205. In the sixth process, terminal electrode paste coating 206 is applied, and the capacitor is completed as a component.

Figure 3:
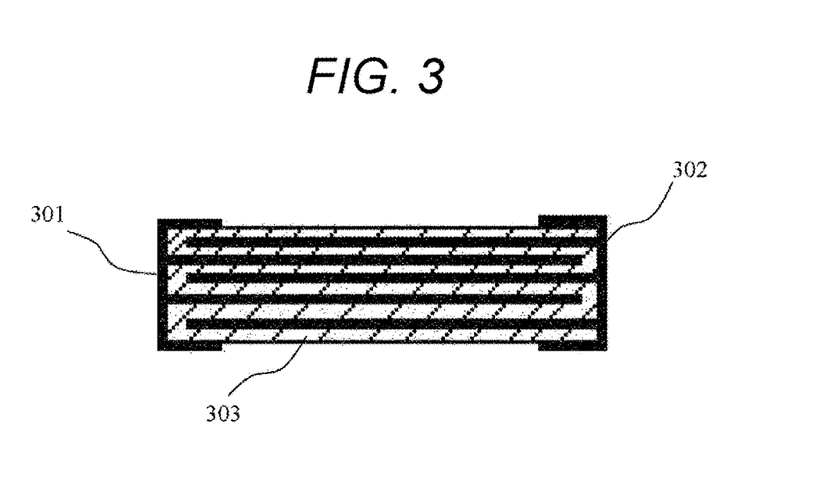
FIG. 3 is a cross-sectional view of the laminated ceramic capacitor.

FIG. 3 is a cross-sectional view of the laminated ceramic capacitor. In order to increase the capacitance of the capacitor, the electrodes made of each layer are alternately laminated, and dielectric sheets 303 are sandwiched between the layers. The internal electrodes each having a positive terminal 301 or a negative terminal 302 are alternately laminated and connected to the respective external electrodes. In FIG. 3, the electrode area of the capacitor can be increased as the number of layers is increased in a limited volume, and thus the capacitance can be increased.

The present invention utilizes the characteristics of the laminated ceramic capacitor, and a perforation process is added to the manufacturing process of the laminated ceramic capacitor, and a spiral pattern is employed for the laminated ceramic capacitor. Accordingly, it is possible to secure a capacitor capacitance and a coil capacity, thereby accomplishing a laminated capacitor which can performs characteristics of a low-pass filter.

Figure 4:
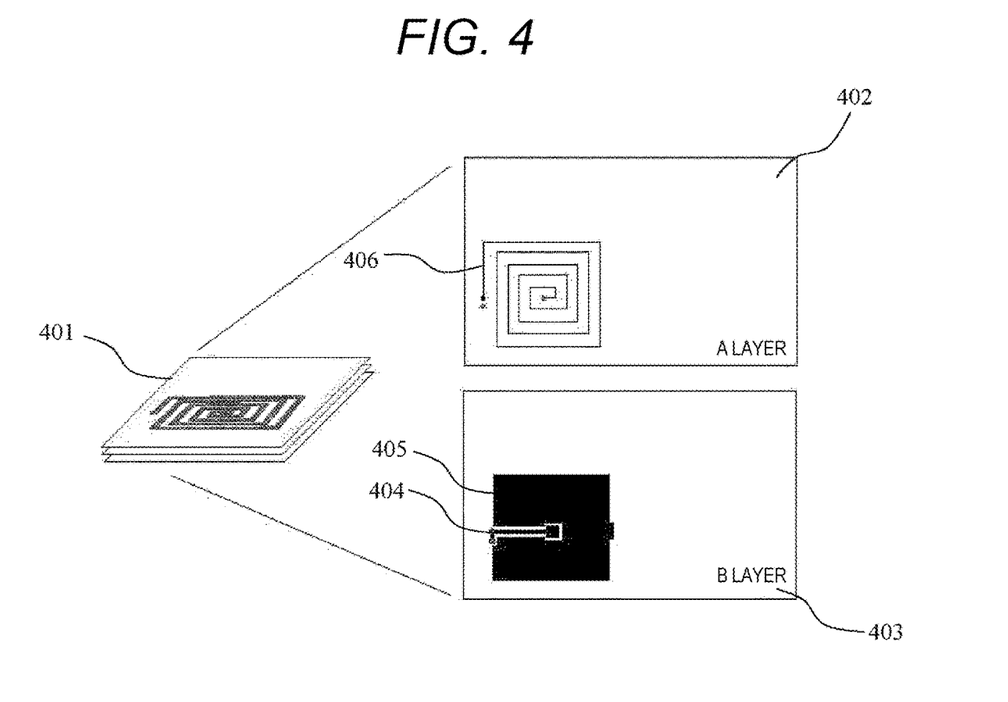
FIG. 4 is an explanatory view of a printing pattern of the present invention.
Figure 5:
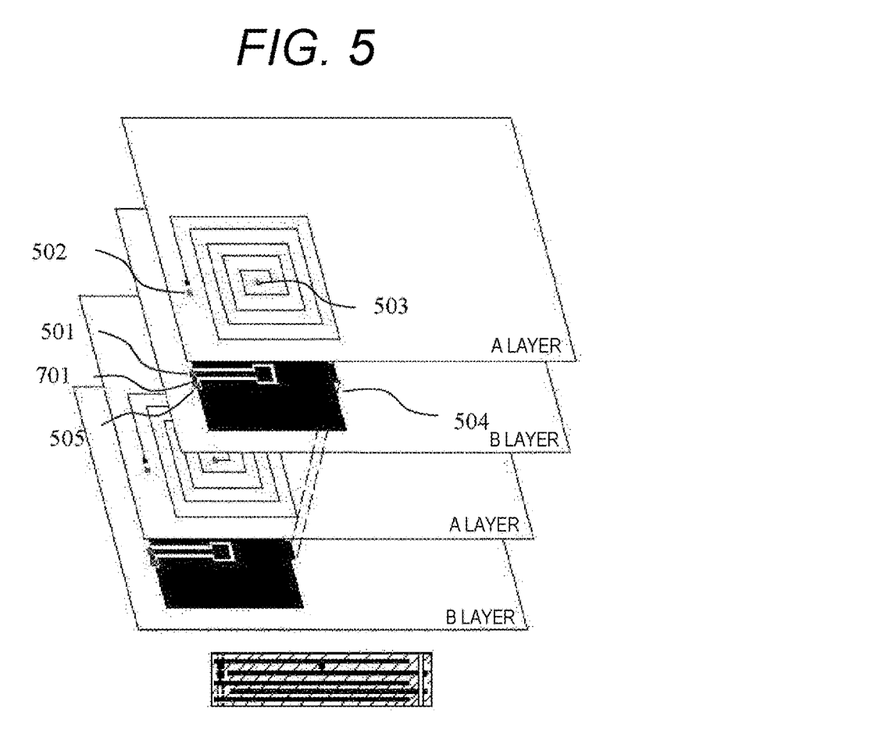
FIG. 5 is a view illustrating hole positions in a perforation process.

FIGS. 4 and 5 illustrate a printing pattern of the laminated capacitor of the present invention and a fabrication process of the printing pattern.

In order to generate capacitors one by one, the conventional electrode has a simple pattern, like the electrode indicated by the electrode printing 202, which is the second process of FIG. 2, wherein the printing pattern is alternately printed on the dielectric sheet A layer and on the dielectric sheet B layer (one dielectric sheet is for terminal and the other dielectric sheet is for ground).

In the process of the electrode printing 202 of FIG. 2, according to the present invention, a spiral pattern 406 is printed on the dielectric sheet A layer 402 as shown in FIG. 4. On the dielectric sheet B layer 403, a pattern for coil series connection 404 and a solid pattern for ground 405 for connecting multiple layers of the spiral pattern in series are printed. These ways forms a coil in the laminated capacitor.

A perforation process is added before the electrode printing process so that each spiral pattern 406, which will constitute a coil layer, is connected in series wherein layers of the spiral pattern sandwich the dielectric sheet B layer 403. As shown in FIG. 5, a hole 503 is opened in the dielectric sheet A layer 402 so that the pattern for coil series connection 404 of the dielectric sheet B layers can be mutually connected. Further, in order to connect the solid pattern for ground provided on a plurality of layers in parallel to each other, a through hole for ground 504 is opened. In order to make the outlet of the spiral pattern leading to the outside of the laminated capacitor, where the plurality of layers of the spiral pattern are connected in series to each other, a hole 502 passing through the last layer of the 600 layers is opened. After the additional perforation process, the spiral pattern 406 is printed on the dielectric sheet A layer 402, and the pattern for coil series connection 404 and the solid pattern for ground 405 are printed on the dielectric sheet B layer 403.

In this way, in the present invention, since the spiral pattern 406 on the plurality of layers are electrically connected in series to each other, the solid pattern for ground 405 on the plurality of layers are electrically connected in parallel to each other, and the spiral pattern 406 and the solid pattern for ground 405 are laminated, the spiral pattern 406 forms one electrode of the capacitor in a range where the spiral pattern 406 overlaps the solid pattern for ground 405 in the stacking direction. The solid pattern for ground 405 serves as an electrode on the ground side of the capacitor and creates the effect of the capacitor. As a result, the spiral pattern 406 can serve as both a pattern for creating the effect of the coil and a pattern for creating the effect of the capacitor, and it is possible to mount with high density the coil and capacitor necessary for the low-pass filter.

Figure 6:
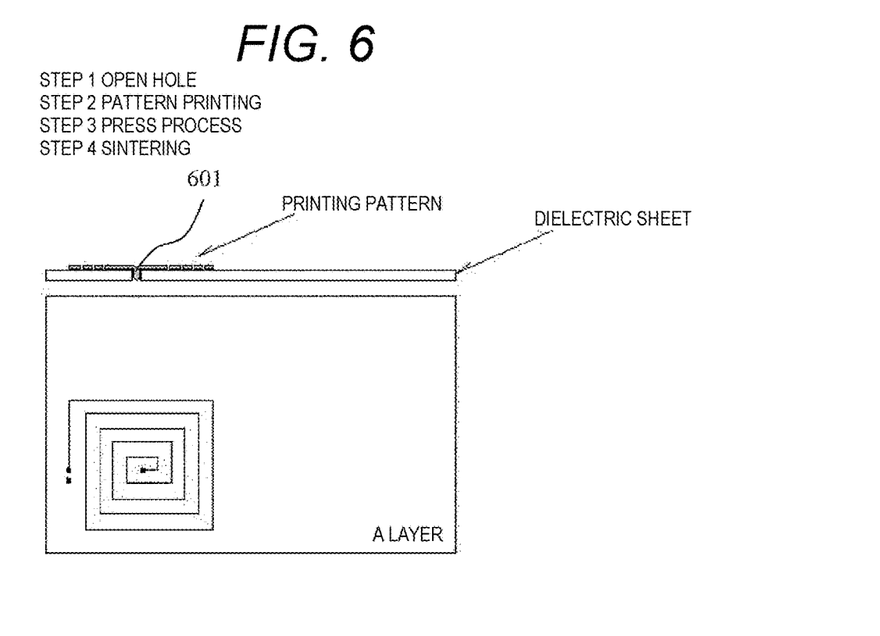
FIG. 6 is an explanatory view of electrode paste movement.

Further, utilizing the pressurization characteristics of the press process 203, the adhesive electrode paste may be connected to the lower layer via a previously opened hole as shown by 601 in the drawing. By taking advantage of these characteristics, it is possible to accomplish the characteristics of coil series connection by connecting a plurality of spiral patterns in series.

Figure 7:
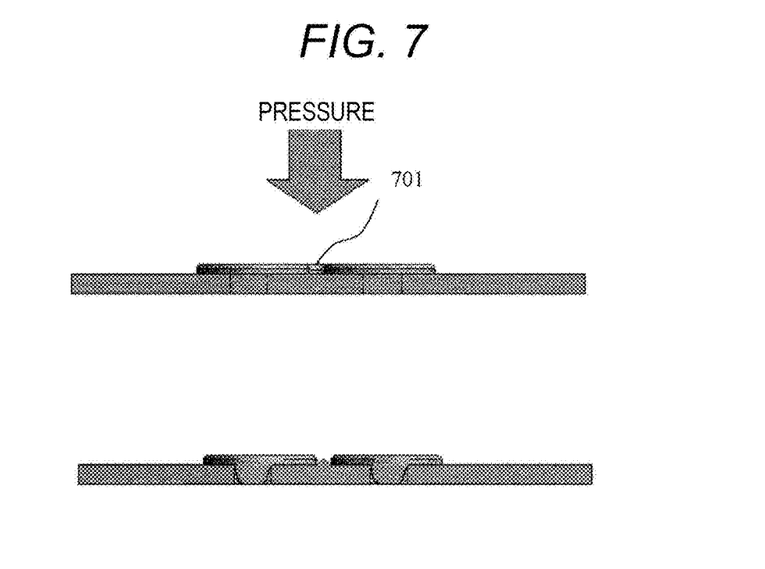
FIG. 7 is an explanatory view of paste movement.

Further, utilizing the characteristic that the tensile strength of the electrode paste is limited, a narrow pattern 701 shown in FIG. 7 is provided between the hole 501 and the hole 505. When the pattern 701 is pressed, the electrode paste is pressed, the electrode paste is moved to the lower layer through the hole, and the narrow pattern is disconnected, the hole 501 and the hole 505 can form a path such that the disconnected narrow pattern is insulated to each other.

Figure 8:
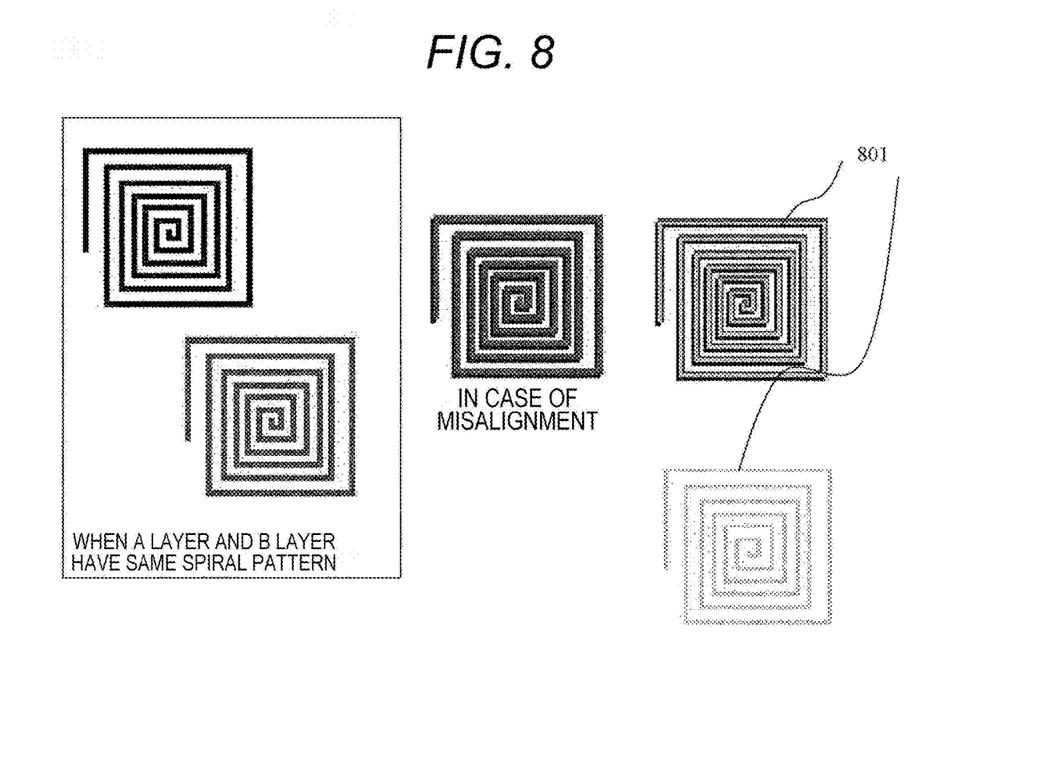
FIG. 8 is an explanatory view of misalignment of a spiral pattern.

Further, the solid pattern for ground 405 is not necessarily a solid pattern, and may be a pattern of spiral patterns having the same shape as the spiral pattern 406 so as to overlap the spiral pattern 406. However, when the two spiral patterns are misaligned as shown in FIG. 8, a deviation occurs for the capacitor capacitance, because the capacitance of the capacitor depends on the area in which the stacked electrodes overlaps.

Figure 9:
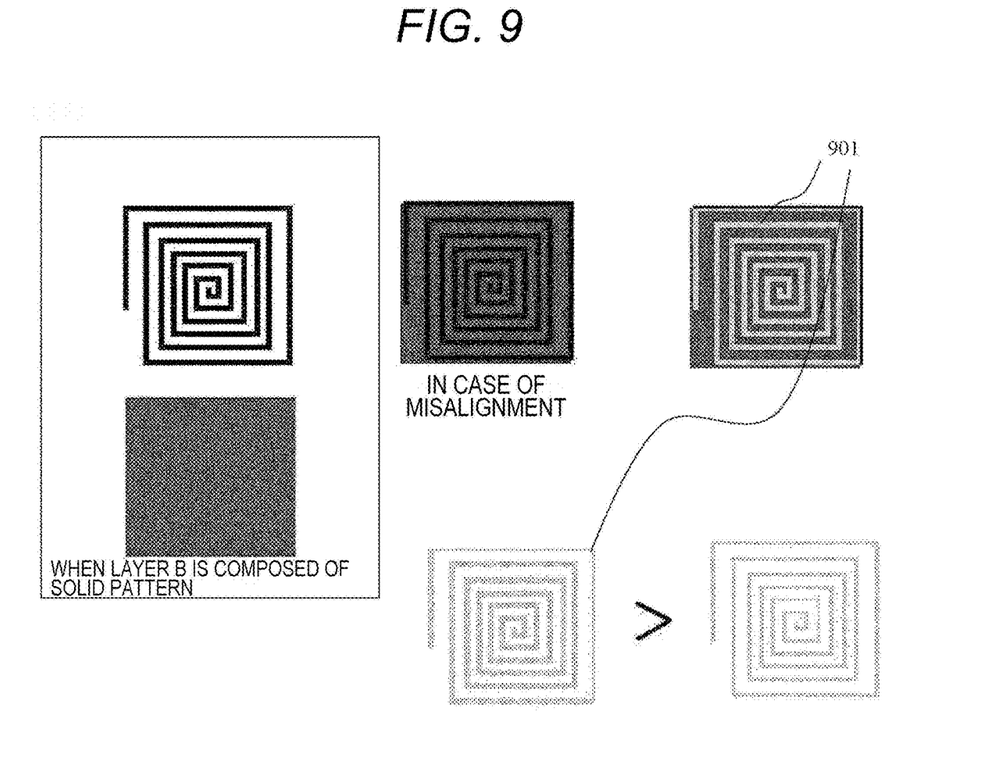
FIG. 9 is an explanatory view of misalignment of a solid pattern.

Therefore, it is desirable to employ a solid pattern or a thicker pattern than the spiral pattern 406 as shown in FIG. 9 for the ground layer, which is the dielectric sheet B layer. In the case where the dielectric sheet A layer 402 uses the same shaped spiral pattern as the dielectric sheet B layer 403, there is an advantage that the mask for electrode printing can be formed in one type. However, if the misalignment as indicated in FIG. 8 occurs, the area which can serve as capacitor capacitance is limited to an area indicated by 801. In the case of a solid pattern, the area indicated by 901 in FIG. 9 serves as the capacitor capacitance.

The additional process (perforation) and pattern design described as mentioned above allows the laminated capacitor which has the built-in coil pattern to be formed.

Figure 10:
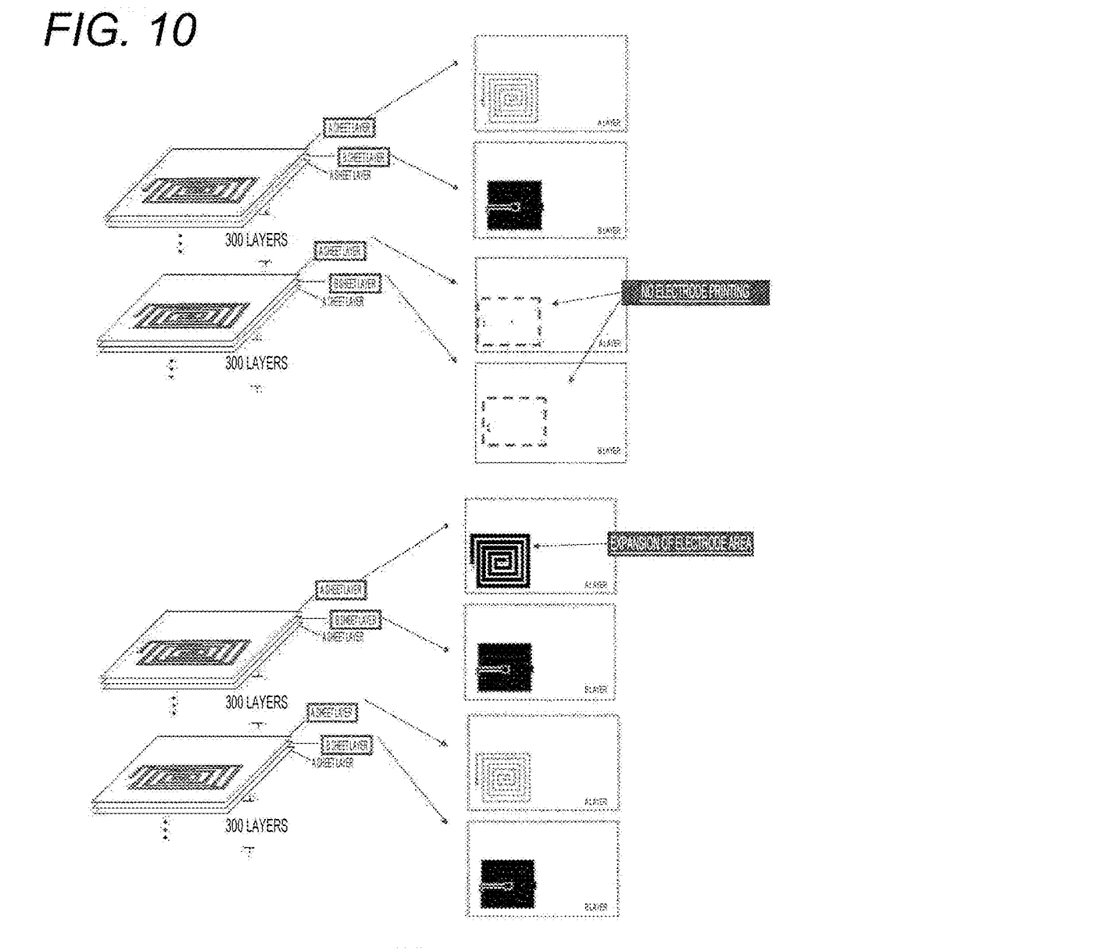
FIG. 10 is a view showing a method of increasing and decreasing a coil capacity and a capacitor capacitance.

Furthermore, since the coil capacity is determined by the density and the series number of the spiral line, and the capacitor capacitance is determined by the area of the electrode area and the interlayer distance, the number of turns of the spiral pattern 406 per dielectric sheet A layer 402, and the number of series connections of the coil composed of the dielectric sheet A layer 402 and the dielectric sheet B layer 403 makes it possible to change the capacity of the coil as shown in FIG. 10.

By adjusting the thickness (area) of the pattern of the spiral pattern 406 and the number of parallel connections, the capacitance of the capacitor can also be adjusted. In addition, it is possible to adjust the capacitance of the capacitor by providing a dielectric sheet that does not print the electrode between the spiral pattern 406 and the pattern for ground to adjust the distance between the electrodes.

The number of series connections of the spiral pattern 406 and the number of parallel connections of the solid pattern for ground 405 can be appropriately adjusted not only by adjusting the number of laminated dielectric sheets themselves but also by providing a pattern without the electrode printed and the like.

Figure 11:
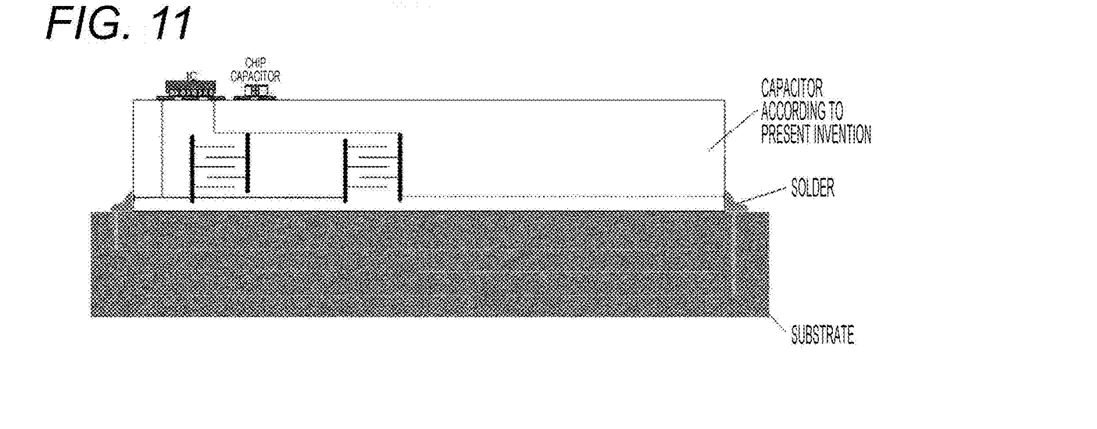
FIG. 11 is an application example of the present invention.

Utilizing the mechanism of the capacitor with a built-in coil pattern, other circuit patterns can be incorporated in the capacitor as shown in FIG. 11. This can reduce a work load of the wiring on the board.

In addition, as shown in FIG. 11, a plurality of LC circuits may be provided in one laminated capacitor package wherein the LC circuit is required for each terminal of IC. For example, for each of the plurality of LC circuits, the number of windings, the area and the number of connections of the spiral pattern 406, the number of dielectric sheets which do not print the electrode, and the number of parallel connections of the solid pattern for ground 405 may be individually varied. In this manner, a plurality of coils and capacitors having different inductances and different capacitor capacitances can be formed in one laminated capacitor package and connected to terminals of the IC and the like. As a result, input output circuits of the IC and the like can be mounted with high density.

REFERENCE SIGNS LIST 102 electronic control unit
107 capacitor
406 spiral pattern
405 solid pattern for ground
404 pattern for coil series connection

The invention claimed is:

1. An in-vehicle control device comprising:
a laminated capacitor incorporating a circuit pattern and a dielectric body,
the circuit pattern comprising:
a plurality of coil effect generation patterns that are laminated; and
an inter-layer connection pattern being configured suck that the plurality of coil effect generation patterns are connected to each other in series,
wherein at least part of the plurality of coil effect generation patterns serves as an electrode of the laminated capacitor, and
the circuit pattern is configured to form a plurality of LC circuits each having a different inductance or a different capacitor capacitance,
wherein the circuit pattern further comprises a plurality of patterns for ground that are laminated, the plurality of coil effect generation patterns and the plurality of patterns for ground are alternately laminated so as to sandwich the dielectric body, the inter-layer connection pattern and the plurality of patterns for ground are insulated from each other, the plurality of coil effect generation patterns are connected in series to each other, and the plurality of patterns for ground are connected to each other via ground.

2. The in-vehicle control device according to claim 1, wherein each pattern for ground has an area larger than the coil effect generation pattern.

3. The in-vehicle control device according to claim 1, wherein an inductance is adjusted based on at least one of a density of the coil effect generation pattern and the number of series connections of the coil effect generation pattern.

4. The in-vehicle control device according to claim 1, wherein a capacitor capacitance is adjusted based on at least one of an area of the coil effect generation pattern and a distance between the coil effect generation pattern and a respective pattern for ground.

5. A laminated capacitor comprising:
a circuit pattern and a dielectric body,
the circuit pattern comprising:
a plurality of coil effect generation patterns that are laminated; and
an inter-layer connection pattern being configured such that the plurality of coil effect generation patterns are connected to each other is series,
wherein at least part of the plurality of coil effect generation patterns serves as an electrode of the laminated capacitor,
wherein the circuit pattern further comprises a plurality of patterns for ground that are laminated, the plurality of coil effect generation patterns and the plurality of patterns for ground are alternately laminated so as to sandwich the dielectric body, the inter-layer connection pattern and the plurality of patterns for ground are insulated from each other, the plurality of coil effect generation patterns are connected in series to each other, and the plurality of patterns for ground are connected to each other via ground.

* * * * *